US010345598B2

(12) United States Patent
Ouderkirk et al.

(10) Patent No.: US 10,345,598 B2
(45) Date of Patent: *Jul. 9, 2019

(54) LOW PROFILE IMAGE COMBINER FOR NEAR-EYE DISPLAYS

(71) Applicant: 3M INNOVATIVE PROPERTIES COMPANY, St. Paul, MN (US)

(72) Inventors: Andrew J. Ouderkirk, Kirkland, WA (US); Erin A. McDowell, Afton, MN (US); Timothy L. Wong, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/954,712

(22) Filed: Apr. 17, 2018

(65) Prior Publication Data

US 2018/0231786 A1    Aug. 16, 2018

Related U.S. Application Data

(63) Continuation of application No. 15/121,489, filed as application No. PCT/US2015/020488 on Mar. 13, 2015, now Pat. No. 9,977,246.

(Continued)

(51) Int. Cl.
*G02B 27/01* (2006.01)
*G02B 5/30* (2006.01)
(Continued)

(52) U.S. Cl.
CPC ....... *G02B 27/0172* (2013.01); *G02B 5/3083* (2013.01); *G02B 6/0046* (2013.01);
(Continued)

(58) Field of Classification Search
CPC ............. G02B 27/0172; G02B 5/3083; G02B 17/004; G02B 27/283; G02B 6/0046;
(Continued)

(56) References Cited

U.S. PATENT DOCUMENTS

RE27,356 E    5/1972    LaRussa
3,680,946 A   8/1972    Bellows
(Continued)

FOREIGN PATENT DOCUMENTS

EP    1008886    6/2000
EP    1024388    8/2000
(Continued)

OTHER PUBLICATIONS

International Search Report for PCT International Application No. PCT/US2015/020488, dated Sep. 4, 2015, 6 pages.

*Primary Examiner* — Frank G Font
(74) *Attorney, Agent, or Firm* — Robert S. Moshrefzadeh

(57) ABSTRACT

An image combiner, also referred to as a combiner optic, of a near-eye display system or the like transmits enough light so a user can see remote objects in a "world view", while also reflecting enough light so the user can simultaneously see a projected image in a "projected" (augmented) view. The disclosed image combiners use two partial reflectors configured to form a wedged reflective cavity. In the display system, light from an imaging device follows a path to the user's eye that includes three reflections in the wedged cavity. By using this capability of the wedged cavity, the combiner optic can have a substantially reduced thickness, and lower profile, than a combiner optic that uses only one partial reflector and only one reflection in the optical path.

7 Claims, 9 Drawing Sheets

Related U.S. Application Data

(60) Provisional application No. 61/954,690, filed on Mar. 18, 2014.

(51) Int. Cl.
*G02B 6/10* (2006.01)
*G02B 17/00* (2006.01)
*G02B 27/28* (2006.01)
*F21V 8/00* (2006.01)

(52) U.S. Cl.
CPC ............ *G02B 6/0056* (2013.01); *G02B 6/105* (2013.01); *G02B 17/004* (2013.01); *G02B 27/283* (2013.01); *G02B 6/10* (2013.01); *G02B 2027/012* (2013.01); *G02B 2027/013* (2013.01); *G02B 2027/0118* (2013.01); *G02B 2027/0125* (2013.01); *G02B 2027/0132* (2013.01); *G02B 2027/0178* (2013.01)

(58) Field of Classification Search
CPC ........ G02B 6/0056; G02B 6/105; G02B 6/10; G02B 2027/0118; G02B 2027/012; G02B 2027/0125; G02B 2027/013; G02B 2027/0132; G02B 2027/0178
USPC ............ 359/485.01, 485.03, 489.07, 489.09, 359/489.11, 489.15, 489.16, 489.18
See application file for complete search history.

(56) References Cited

U.S. PATENT DOCUMENTS

| | | | |
|---|---|---|---|
| 5,610,765 A | 3/1997 | Colucci | |
| 5,654,827 A | 8/1997 | Reichert | |
| 5,654,828 A | 8/1997 | Togino | |
| 5,659,430 A | 8/1997 | Togino | |
| 5,715,023 A | 2/1998 | Hoppe | |
| 5,768,025 A | 6/1998 | Togino et al. | |
| 6,266,194 B1 | 7/2001 | Tanijiri | |
| 6,304,303 B1 | 10/2001 | Yamanaka | |
| 6,353,503 B1 | 3/2002 | Spitzer | |
| 6,487,021 B1 | 11/2002 | Ophey | |
| 6,785,049 B1 | 8/2004 | Boyd et al. | |
| 7,242,524 B2 | 7/2007 | Dike | |
| 7,329,006 B2 | 2/2008 | Aastuen | |
| 7,724,443 B2 | 5/2010 | Amitai | |
| 7,751,122 B2 | 7/2010 | Amitai | |
| 8,294,994 B1 | 10/2012 | Kelly | |
| 8,432,614 B2 | 4/2013 | Amitai | |
| 8,643,948 B2 | 2/2014 | Amitai et al. | |
| 8,873,150 B2 | 10/2014 | Amitai | |
| 9,977,246 B2 * | 5/2018 | Ouderkirk | G02B 17/004 |
| 2002/0024743 A1 | 2/2002 | Endo | |
| 2002/0047837 A1 | 4/2002 | Suyama | |
| 2002/0105737 A1 | 8/2002 | Takahashi | |
| 2004/0014504 A1 | 1/2004 | Coates | |
| 2007/0070859 A1 | 3/2007 | Hirayama | |
| 2008/0151379 A1 | 6/2008 | Amitai | |
| 2008/0273246 A1 | 11/2008 | Moliton et al. | |
| 2009/0122414 A1 | 5/2009 | Amitai | |
| 2010/0165660 A1 | 7/2010 | Weber | |
| 2010/0177113 A1 | 7/2010 | Gay | |
| 2010/0238414 A1 | 9/2010 | Togino | |
| 2012/0019923 A1 | 1/2012 | Niesten | |
| 2012/0162549 A1 | 6/2012 | Gao | |
| 2012/0188470 A1 | 7/2012 | Tanaka | |
| 2013/0229717 A1 | 9/2013 | Amitai | |
| 2013/0279017 A1 | 10/2013 | Amitai | |
| 2014/0063055 A1 | 3/2014 | Osterhout | |
| 2014/0240843 A1 | 8/2014 | Kollin | |
| 2015/0185480 A1 | 7/2015 | Ouderkirk | |
| 2016/0116743 A1 | 4/2016 | Amitai | |
| 2016/0170212 A1 | 6/2016 | Amitai | |
| 2016/0170213 A1 | 6/2016 | Amitai | |
| 2016/0170214 A1 | 6/2016 | Amitai | |
| 2016/0341964 A1 | 11/2016 | Amitai | |

FOREIGN PATENT DOCUMENTS

| | | |
|---|---|---|
| RU | 2143718 | 12/1999 |
| WO | WO 2003-023277 | 3/2003 |
| WO | WO 2005-052651 | 6/2005 |
| WO | WO 2007-126148 | 11/2007 |
| WO | WO 2012-118573 | 9/2012 |

* cited by examiner

LOW PROFILE IMAGE COMBINER FOR NEAR-EYE DISPLAYS

FIELD OF THE INVENTION

This invention relates generally to lenses and related optical components, with particular application to optical components that include a partially reflective element to allow simultaneous viewing of remote objects and a projected image. The invention also relates to associated articles, systems, and methods.

BACKGROUND

Optical beamsplitters are known. Some beamsplitters are made by cementing two prisms together with a reflective film in between. See e.g. U.S. Pat. No. 7,329,006 (Aastuen et al.) Lenses are also known. Known lenses include compound lenses in which two or more simple lenses are cemented together. U.S. Pat. No. 5,654,827 (Reichert) discusses lenses in which the lens is divided into two parts by a beamsplitter.

Head-Up Displays or Head-Mounted Displays (collectively referred to herein as HUDs) can project an image that fills all or part of a user's field of view. Some HUDs use a combiner optic that integrates the projected image with the usual image of the external environment. In some cases, the HUD is a Near-Eye Display (NED), which may have a form factor similar to that of eyeglasses. See e.g. U.S. Pat. No. 6,353,503 (Spitzer et al.).

BRIEF SUMMARY

In near-eye displays and the like, the display system uses at least one combiner optic, such as a combiner lens, that optically combines a world view with an augmented (projected) view by superimposing one on the other. In the world view, the user sees distant objects through the combiner optic. In the augmented view, the user sees an image produced by a small projector and reflected into the user's eye by the combiner optic. The system preferably combines the two views with high quality optical performance and in a robust package. Furthermore, it is desirable for the glasses to be lightweight and aesthetically pleasing. The combiner optic can play a significant role not only in the optical performance but also the aesthetics and the weight of the display system.

We have developed a new family of combiner optics, such as combiner lenses, that can provide the two superimposed views in a component size whose axial dimension (thickness) can be made quite small. The reduced thickness can be used to reduce the volume and thus the weight of the combiner optic, as well as enhance system aesthetics by providing a thin, modern, "low profile" design. The reduced thickness capability is made possible by certain optical design features of the combiner optic. In brief, the combiner optic uses two partial reflectors that form a wedged reflective cavity. Imaging light that produces the projected (augmented) view follows a path from the imaging device to the user's eye, and the partial reflectors are configured so that this light path includes three reflections in the wedged reflective cavity. By employing the multiple reflections in the reflective cavity, the partial reflectors can be oriented at a smaller tilt angle, i.e., more nearly perpendicular to the longitudinal or optical axis of the combiner optic, compared to the tilt angle that would be needed for a single-reflection beamsplitter, which makes possible the thinner product configuration. The less tilted design feature of the disclosed combiner optics is also beneficial for wide angle viewing, both for the world view and for the projected view.

We therefore describe herein, among other things, display systems that permit simultaneous viewing of remote objects and a projected image, the systems including a combiner optic and an imaging device. The combiner optic has a proximal end and a distal end, the proximal end being suitable for placement near a user's eye. The imaging device is disposed to direct imaging light towards the proximal end of the combiner optic. The combiner optic includes first and second partial reflectors that form a wedged reflective cavity, and the imaging light follows a light path to the user's eye that includes three reflections in the wedged reflective cavity.

The first partial reflector may be or include a reflective polarizer. The reflective polarizer may be disposed at or near the proximal end of the combiner optic, such that the imaging light propagating along the light path encounters the reflective polarizer before encountering the second partial reflector. The reflective polarizer may be or include a circular reflective polarizer. The reflective polarizer may be or include a linear reflective polarizer, and the combiner optic may further include a retarder layer disposed between the first and second partial reflectors. The retarder layer may have a retardance of substantially $\lambda/4$. The three reflections in the reflective cavity may include a first reflection at the reflective polarizer and a first and second reflection at the second partial reflector. The retarder layer may have a fast axis and the reflective polarizer may have a pass axis, and the fast axis may be oriented relative to the pass axis so that the first reflection at the reflective polarizer occurs with little or no transmission of the imaging light through the reflective polarizer.

The combiner optic may include distinct first and second lenses, and the first lens may attach to the second lens through the second partial reflector. The first lens may have a first curved surface, and the second lens may have a second curved surface shaped to match the first curved surface.

The second partial reflector may be or include a notched reflector. Over a wavelength range from 400-700 nm, the notched reflector may include at least one distinct reflection band whose full width at half maximum (FWHM) is less than 100 nanometers. The second partial reflector may have a reflectivity at normal incidence that is substantially insensitive to polarization state. Over a wavelength range from 400-700 nm, the second partial reflector may have no distinct reflection band whose full width at half maximum (FWHM) is less than 100 nanometers. The first partial reflector may have an average reflectivity for the imaging light in a range from 25% to 75%, and the second partial reflector may have an average reflectivity for the imaging light in a range from 25% to 75%.

The reflective polarizer may define a pass state and a block state of polarization, and the block state of the reflective polarizer may provide a notched reflection spectrum, and the imaging light may comprise one or more distinct spectral output peaks corresponding to the notched reflection spectrum. Furthermore, the second partial reflector may be or include a notched reflector having a second notched reflection spectrum corresponding to the notched reflection spectrum of the block state of the reflective polarizer.

We also describe combiner optics that have a proximal end and a distal end, such combiner optics including a first lens at or near the proximal end and a second lens at or near the distal end. First and second partial reflectors may be disposed on opposed ends of the first lens, the first partial reflector being attached to a first surface of the first lens, and the second partial reflector being sandwiched between the first and second lenses. The first and second partial reflectors may have sufficient light transmission to permit viewing of remote objects through the combiner optic, and the first and second partial reflectors may form a wedged reflective cavity.

The first partial reflector may be or include a reflective polarizer. The first partial reflector may be or include a linear reflective polarizer, and the combiner optic may also include a retarder layer disposed between the first and second partial reflectors. The first and second partial reflectors may have reflectivities tailored such that imaging light directed at the proximal end provides a viewable image to an eye disposed near the proximal end via a light path that includes three reflections in the wedged reflective cavity.

We also disclose optics (optical elements) that redirect light from a source to a detector. The optic includes a reflective polarizer and a reflector arranged to form a wedged reflective cavity. The optic also includes a retarder layer between the reflective polarizer and the reflector. The retarder layer is oriented relative to the reflective polarizer such that light that enters the wedged reflective cavity through the reflective polarizer exits the wedged reflective cavity through the reflective polarizer after three reflections in the wedged reflective cavity.

The reflective polarizer may be a broad band polarizer that operates over most or all of a visible wavelength spectrum, or the reflective polarizer may instead be or include a notched reflector. In either case, the reflective polarizer may have a reflectivity for at least some light in a block state of polarization of over 50%, or over 70%, or over 90%, or over 99%. The retarder layer may have a retardance of substantially $\lambda/4$. The reflector may be a partial reflector with sufficient light transmission to permit optical detection of remote objects through the wedged reflective cavity and through the optic, such that the optic is a combiner optic. Alternatively, the optic may have insufficient light transmission to permit optical detection of remote objects through the wedged reflective cavity or through the optic, such that the optic is not a combiner optic. Systems that incorporate such optics are also disclosed. The systems may include an imaging device that directs imaging light towards the reflective polarizer of the optic. The systems may also or alternatively include a detector disposed to receive the light that exits the wedged reflective cavity through the reflective polarizer. In some cases the detector may be a person's eye, or it may instead be or include an electronic detector.

Other aspects of the invention can be found in the appended claims and the detailed description that follows.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

In the figures, like reference numerals designate like elements.

DETAILED DESCRIPTION OF ILLUSTRATIVE EMBODIMENTS

As mentioned above, we have developed combiner optics whose axial dimension or thickness can, if desired, be made smaller than that of a conventional combiner optic due to the incorporation of two partial reflectors that are tilted relative to each other to form a wedged reflective cavity. In forming the projected view, light from an imaging device in the display system follows a path to the user's eye that includes three reflections in the wedged reflective cavity.

Figure 1:
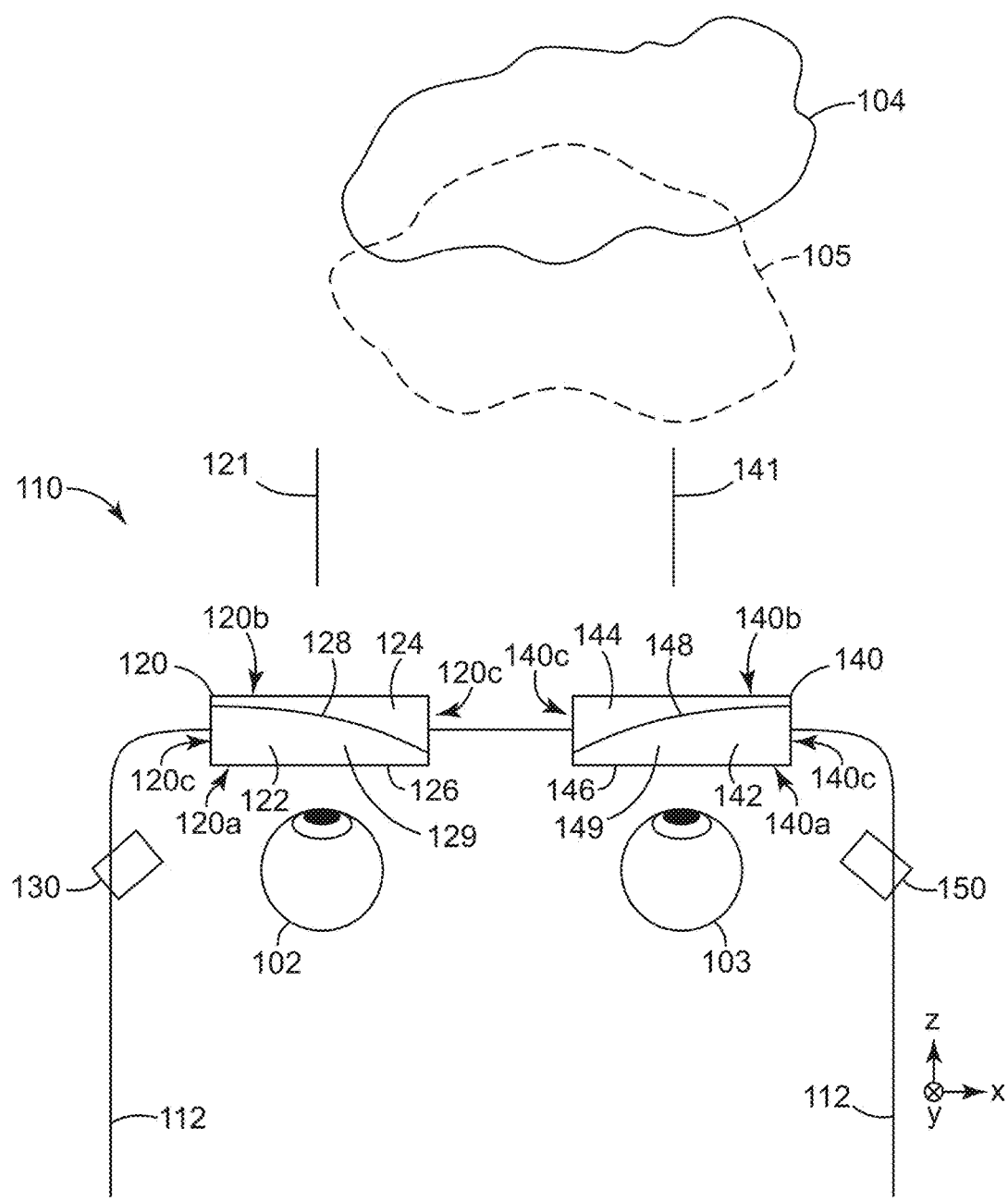
FIG. 1 is a schematic top view of a near-eye display system, in the form of eyewear, that incorporates a left and right combiner optic as described herein.

Turning to FIG. 1, we see there a schematic view of a display system 110 that allows a user to simultaneously perceive a world view and a projected view. The system 110 is shown in the context of a Cartesian x-y-z coordinate system for ease of description. The world view may be associated with real objects such as remote object 104. The projected view is produced by one or both of a left imaging device 130 and a right imaging device 150, and may be superimposed on the world view. The projected view is represented in the figure by a virtual object 105 which is formed by the projected light. In some cases, two different projected views, with two or more different associated virtual objects, may be provided, e.g. a left projected view provided by the left imaging device 130 and a right projected view provided by the right imaging device 150. If distinct left and right projected views are provided, they may be left and right stereoscopic views of one or more virtual objects, thus providing a 3-dimensional appearance or illusion of such object(s) to the user. Alternatively, the left and right projected views may instead be views of different unrelated virtual objects. In still other cases, one of the imaging devices 130, 150 may be omitted, such that the display system 110 includes only one imaging device, and provides only one projected view.

The disclosed display systems may be made in any suitable style or format, such as eyewear (e.g. eyeglasses) or headwear (e.g. hats, helmets, or visors), so long as at least one combiner optic and its associated imaging device is held in place or otherwise positioned or suspended near an eye of the user. The display system 110 of FIG. 1 is illustrated as eyewear, and as such it includes a suitable frame 112 that may be supported by the ears and nose of the user. The frame 112 holds a left combiner optic 120 and a right combiner optic 140 in place next to a left eye 102 and a right eye 103, respectively, of the user. The frame also holds a left imaging device 130 and a right imaging device 150 near, and at an appropriate orientation angle relative to, their respective combiner optics 120, 140.

The combiner optic 120 has opposed first and second optical surfaces 120a, 120b, which are typically outermost surfaces exposed to air. The first optical surface 120a is at a proximal end of the optic 120, suitable for placement near the user's eye 102. The second optical surface 120b is at a distal end of the optic 120, facing away from the user and outward toward any remote object(s) that may be present. A circumferential side surface 120c connects the first optical surface 120a with the second optical surface 120b. The combiner optic typically includes two or more distinct optical bodies such as lenses or prisms that mate with each other and are bonded or otherwise attached or affixed together so that the combiner optic is in the form of a single optical module or package. The combiner optic 120 is shown as being made of one optical body 122 at the proximal end of the optic and another optical body 124 at the distal end of the optic. The optical surfaces of these optical bodies may be planar, non-planar (e.g., curved), or combinations of planar and non-planar, such as in the case of bodies 122 and 124, each of which has one planar optical surface and one curved optical surface.

The optical body 122, the optical body 124, and other optical bodies disclosed herein may be considered to be a lens if at least one of its optical surfaces is curved, e.g., convex or concave, rather than being flat or planar. The curvature may be spherical, i.e., it may have a constant radius of curvature over substantially the entire optical surface, or it may be aspherical, with a radius of curvature that changes over the optical surface, usually in a gradual and continuous fashion. The curvature provides the optical body with a non-zero optical power, e.g. a positive optical power in the case of a converging lens or a negative optical power in the case of a diverging lens, unless both optical surfaces have the same curvature, in which case the lens may have a zero optical power and may be neither converging nor diverging. Also, the curvature of the optical surface of a body may reside in two orthogonal cross-sectional planes, e.g. the x-z plane and the y-z plane of FIG. 1, or it may reside in only one of two orthogonal cross-sectional planes, e.g., it may reside in the x-z plane but not the y-z plane.

An optical body whose opposed optical surfaces are both planar, but tilted or skewed relative to each other, may be referred to herein as a prism rather than a lens. See e.g. FIG. 3.

A given combiner optic may include optical bodies that are lenses and/or prisms. Depending on whether the optical surfaces of the optical bodies are planar or curved, and depending on other factors such as the refractive indices of the optical bodies, the combiner optic 120 may have a non-zero optical power, e.g. it may have a net converging effect or a net diverging effect on light that passes through it, or it may have a zero or substantially zero optical power. Note also that the optical power provided by the combiner optic may be, and typically is, different for the world view compared to the projected view, due to the different light paths used by these two views. In the case of combiner optic 120, if the optical bodies 122, 124 have the same or similar refractive index, and the optical surfaces 120a, 120b are substantially planar, the optic 120 may have substantially zero optical power for the world view, but, if the partial reflector 128 is curved as shown, it may have a significant non-zero optical power for the projected view.

Each combiner optic may define a longitudinal or optical axis. This axis may be defined to coincide with the optical axis of the eye it is designed to work with. Thus, in FIG. 1, the longitudinal axis 121 of combiner optic 120 also coincides with the optical axis of the user's left eye 102 when the display system 110 is properly positioned on or near the user's head, and the longitudinal axis 141 of combiner optic 140 coincides with the optical axis of the user's right eye 103. In many cases, the longitudinal axis of a given combiner optic also passes through the geometrical centers of at least the optical surfaces at the proximal and distal ends of the optic, e.g., optical surfaces 120a, 120b of combiner optic 120. Although the longitudinal axis may be an axis of symmetry with respect to one or some optical surfaces of the combiner optic, such as the opposed optical surfaces at the proximal and distal ends of the optic, it may not be—and in many cases is not—an axis of symmetry of other optical surfaces, particularly an optical surface that is embedded in the combiner optic and associated with one of the two partial reflectors in the combiner optic.

In this regard, the combiner optic 120 of FIG. 1 includes a partial reflector 126 and a partial reflector 128. The partial reflector 128 is embedded in the combiner optic 120 and is tilted and curved in such a way that it is not symmetric with respect to the longitudinal axis 121 of the optic 120. More aspects and features of the partial reflectors are discussed further below. One or both of the two partial reflectors in the combiner optic are preferably tilted relative to the longitudinal axis, and may also be curved, in such a way as to define a wedged reflective cavity. The cavity is wedged because it is designed to work with the imaging device, which is separated from, and off to one side of, the user's eye, and thus also displaced from the longitudinal axis of the optic. In the case of combiner optic 120, the partial reflectors 126, 128 form a wedged reflective cavity 129. The partial reflectors 126, 128 and the cavity 129 are configured so that imaging light of the projected view follows a path from the imaging device 130 to the user's left eye 102 that includes three reflections in the cavity 129.

The various parts and features of the left combiner optic 120 have now been discussed. The reader will understand that the right combiner optic 140 may have the same or substantially similar design as the left optic 120, except that it may have a mirror image symmetry relative to the optic 120, as shown in FIG. 1. Thus, the right combiner optic 140 has opposed first and second optical surfaces 140a, 140b at proximal and distal ends of the optic 140, a circumferential side surface 140c, an optical body 142 at the proximal end and another optical body 144 at the distal end of the optic 140, a longitudinal or optical axis 141, and partial reflectors 146, 148 that form a wedged reflective cavity 149, and all of these elements may be the same as or similar to their respective counterparts in the right combiner optic 120.

Figure 1A:
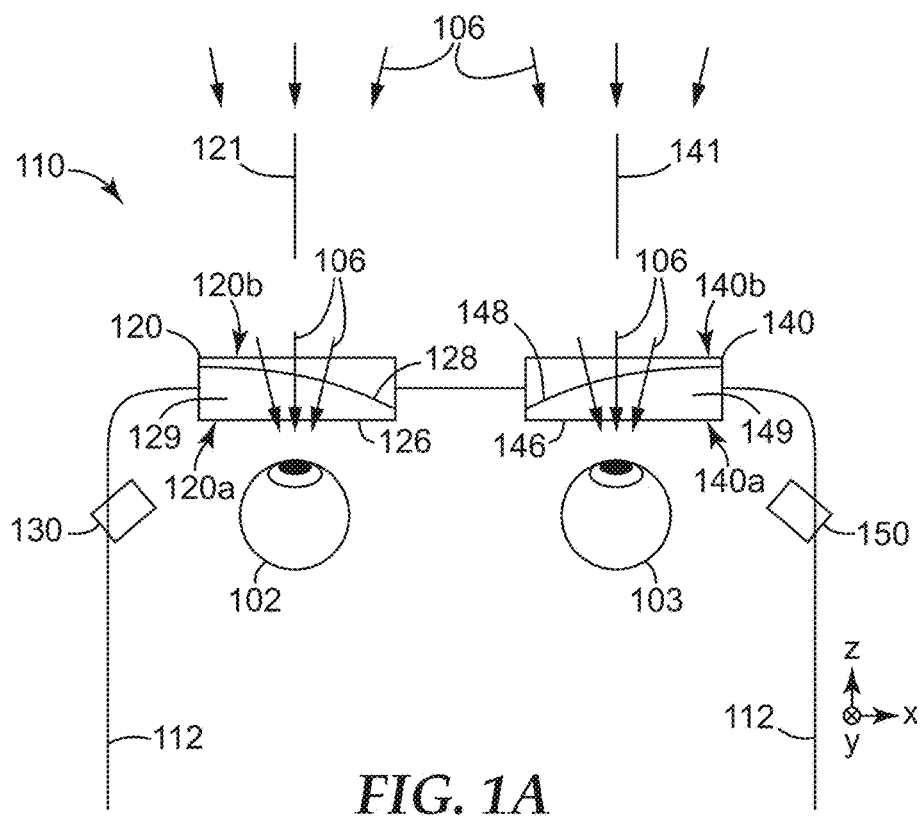
FIGS. 1A and 1B are schematic views showing how this eyewear allows the user to see a world view and a projected view respectively.
Figure 1B:
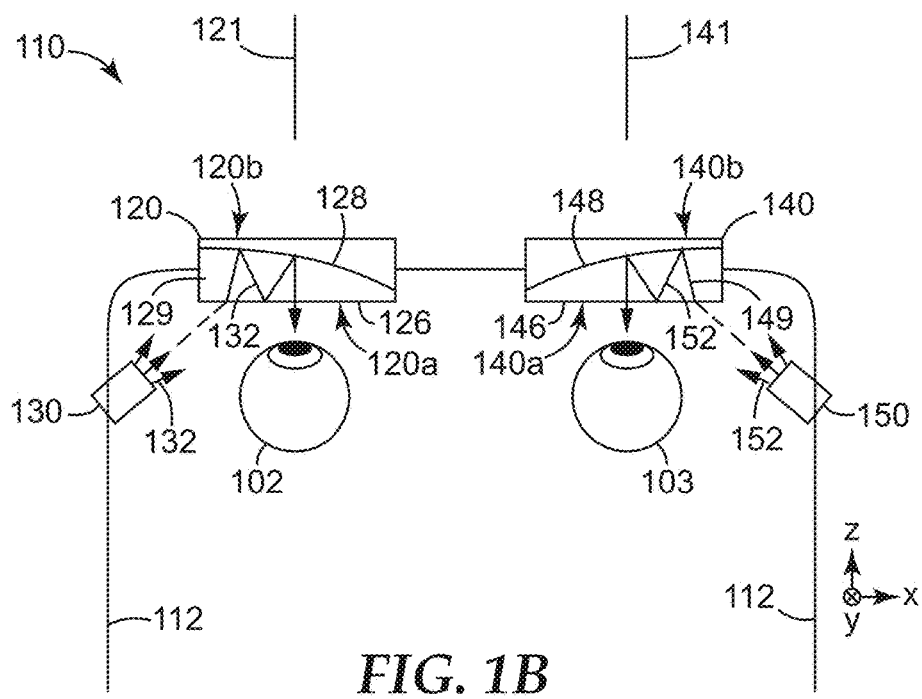

FIGS. 1A and 1B are schematic views of the display system of FIG. 1 in operation. FIG. 1A shows how light that produces the world view is handled by the system. FIG. 1B shows how light that produces the projected view is handled by the system. In these figures, like reference numbers refer to like elements from FIG. 1, and their descriptions will not be repeated here.

In FIG. 1A, light 106 from one or more remote objects propagates from the object(s) to the user of the system 110. The light 106 is typically visible light, but may also be or include non-visible wavelengths such as ultraviolet and/or near infrared. The light 106 is also typically unpolarized, but in some cases it may be weakly or even strongly polarized. In a simple case, the light may be unpolarized, broadband white light, e.g., ambient sunlight, daylight, or office lighting reflected off of a physical object. The light 106 encounters the outermost optical surfaces 120b, 140b of the combiner optics 120, 140, whereupon the light 106 enters the respective combiner optics by refraction. Unless an antireflection coating is provided at those outermost optical surfaces, some reflection will also occur at those surfaces in accordance with the well-known Fresnel equations for a simple air/dielectric interface. In this regard, the optical bodies that make up the combiner optics, such as optical bodies 122 and 124 of optic 120 and optical bodies 142 and 144 of optic 140, may be made of any suitable light-transmissive optical material, for example, an optically clear polymer such as a polycarbonate, an acrylate such as polymethylmethacrylate (PMMA), a cyclic polyolefin copolymer and/or a cyclic polyolefin polymer, or a silicone, or an optical glass or ceramic such as a soda lime glass, a borosilicate glass, silica, or sapphire. All or most of these materials are dielectrics. Typically, the optical bodies of a given combiner optic, such as bodies 122 and 124 of combiner optic 120, are composed of the same or similar optical material, and have the same or similar refractive index. But in some cases, the bodies 122, 124 may be composed of substantially different optical materials, and may have substantially different refractive indices, or substantially the same refractive indices with some material combinations. The refractive index of each body 122, 124 is typically isotropic rather than birefringent. Even though a simple air/dielectric interface reflects some light and transmits the remainder, such an interface is not considered to be a "partial reflector" for purposes of this application. The amount of light reflected at such an interface is also typically quite small, e.g., less than 8%, or less than 6%, or less than 5% for light that is incident at normal or near-normal incidence angles.

Referring now for convenience to the left combiner optic 120, the light 106 that enters the combiner optic propagates through the optical body 124 (see FIG. 1) until it encounters the partial reflector 128. In this embodiment, the partial reflector 128 is assumed to be sandwiched between matching curved surfaces of the bodies 122, 124. Here, depending on the characteristics of the light 106 (such as wavelength, polarization, incidence angle) and the characteristics of the partial reflector 128, a portion of the light 106 may be reflected, and the remainder transmitted through the partial reflector 128 into the optical body 122 (see FIG. 1). The portion of the light 106 that is reflected at the partial reflector 128 may be small or minimal, e.g., less than 10%, or less than 5%, for example if the partial reflector 128 is a (spectrally) notched reflector and a substantial portion of the light 106 is at wavelengths that avoid the reflection band(s) of the notched reflector, or if the partial reflector is a reflective polarizer and a substantial portion of the light 106 has a polarization orthogonal to the polarization reflected by the reflective polarizer. Alternatively, a more significant portion of the light 106 may be reflected at the partial reflector 128, e.g., up to 20%, or up to 30%, or up to 40%. In many cases, the optical absorption of the partial reflector 128 may be small or negligible, such that the portion of the light 106 that is transmitted by the partial reflector 128 substantially or approximately equals 100% minus the amount of the light 106 that is reflected by the partial reflector 128. In some cases, however, such as where the partial reflector 128 is or includes a metal vapor coat, the absorption may be more significant, such that the sum of reflectivity and transmission is less than 100%.

The portion of the light 106 that is transmitted by the partial reflector 128 propagates through the optical body 122 (see FIG. 1) to the partial reflector 126. In this embodiment, the partial reflector 126 is assumed to be formed on, adhered to, or otherwise applied to the outer optical surface of the optical body 122. At the partial reflector 126, depending on characteristics of the light 106 and the characteristics of the partial reflector 126 (see the discussion above relating to the partial reflector 128), a portion of the light 106 may be reflected, and the remainder transmitted through the partial reflector 126, out of the combiner optic 120, and onward to the user's eye 102.

FIG. 1B shows how the display system 110 operates in providing a projected view to the user. In the description that follows, we will concentrate on the operation of the left half of the system 110, with the understanding that the right half, which includes the imaging device 150 and the right combiner optic 140, may operate in substantially the same or similar way.

The imaging device 130 may be or comprise an OLED display, a transmissive liquid crystal display, a reflective LC display (such as, for example, a Liquid Crystal on Silicon (LCoS) display), or a scanned laser device. In any case, the device 130 emits imaging light 132 which can be perceived by the user as a virtual image, after reflection by the combiner optic. The imaging light 132 may be ordinary unpolarized white light, or it may have specific properties, e.g., spectral and/or polarization properties, that are tailored to match or substantially match optical characteristics of one or both of the partial reflectors 126, 128 to enhance system efficiency, e.g., so that one or both of the partial reflectors 126, 128 provide a higher reflectivity for the imaging light 132, while also providing a high transmission of light from remote objects. Thus, the device 130 may emit polarized light, and one or both of the partial reflectors 126, 128 may then be tailored to have a higher reflectivity for that polarization state and a lower reflectivity (and higher transmission) for light of the orthogonal polarization state. Alternatively or in addition, the device 130 may emit imaging light selectively in one or more narrow bands (e.g., it may emit light in only one narrow band, such as in the red, green, or blue region of the spectrum, or it may emit light in two or three such narrow bands that do not substantially overlap), and the partial reflector(s) may then be tailored to have a high reflectivity only in the narrow band or bands of the imaging light 132. The foregoing may be restated by noting that one or each of the partial reflectors may, in some embodiments of the display system, be tailored to have a higher reflectivity, and lower transmission, for the imaging light 132 than for ordinary ambient light (e.g., unpolarized, broadband white light) which may typically characterize the light emitted by remote objects.

Upon leaving the imaging device 130, the imaging light 132 follows a path that involves an interaction with the combiner optic 120 and ends at the retina of the user's eye 102, the interaction with the optic 120 including multiple reflections in the wedged reflective cavity 129 formed by the partial reflectors 126, 128. The imaging light 132 encounters the outermost optical surface 120a of the combiner optic 120 at its proximal end, at which (in the embodiment of FIG. 1) the partial reflector 126 is located. Some of the light 132 is reflected here, and a remaining portion is transmitted by the partial reflector 126 and enters the wedged reflective cavity 129 by refraction. The cavity 129 in this case substantially corresponds to the optical body 122. The transmitted/refracted portion of the imaging light 132 then propagates within the reflective cavity 129 and optical body 122, where a portion of it is reflected first by the partial reflector 128, then by the partial reflector 126, and again by the partial reflector 128. After the third reflection in the cavity 129 (which is the second reflection at the partial reflector 128), the path of the light 132 leads to the partial reflector 126, where a portion of the light is reflected and a portion of the light is transmitted. The light 132 that is transmitted at this point exits the combiner optic 120 and travels onward to the user's eye 102 along the longitudinal axis 121. The ray of imaging light 132 shown schematically in the figure is but one of a bundle of rays emitted by the imaging device 130, each of which follow paths with similar characteristics, and in particular with three reflections in the reflective cavity 129, the collection of these rays combining to present a projected image to the user which may be superimposed on the user's world view.

Figure 2A:
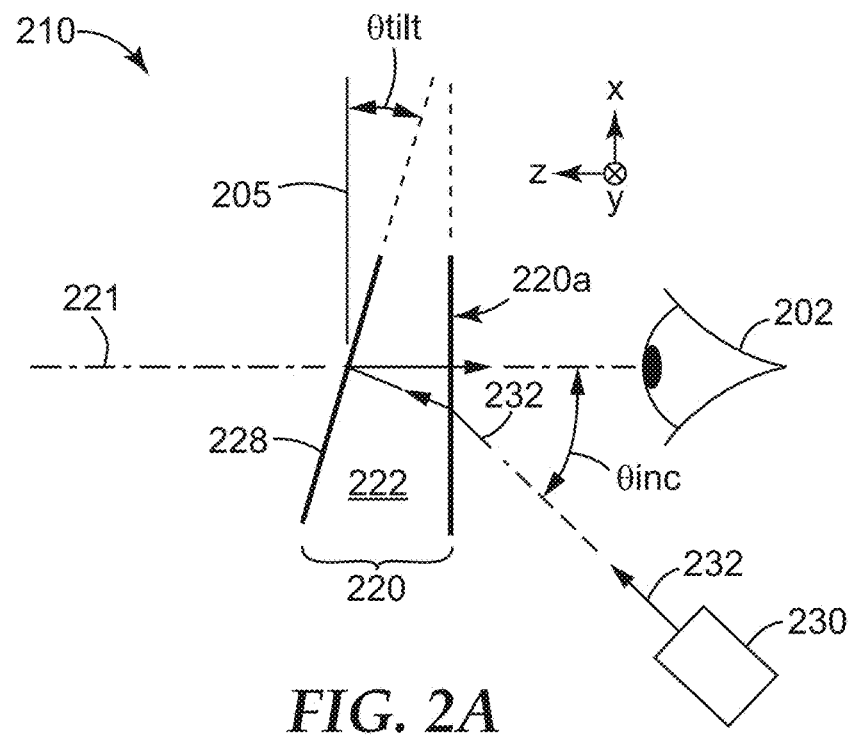
FIG. 2A is a schematic side or sectional view of a display system in which the combiner optic uses only one partial reflector.
Figure 3A:
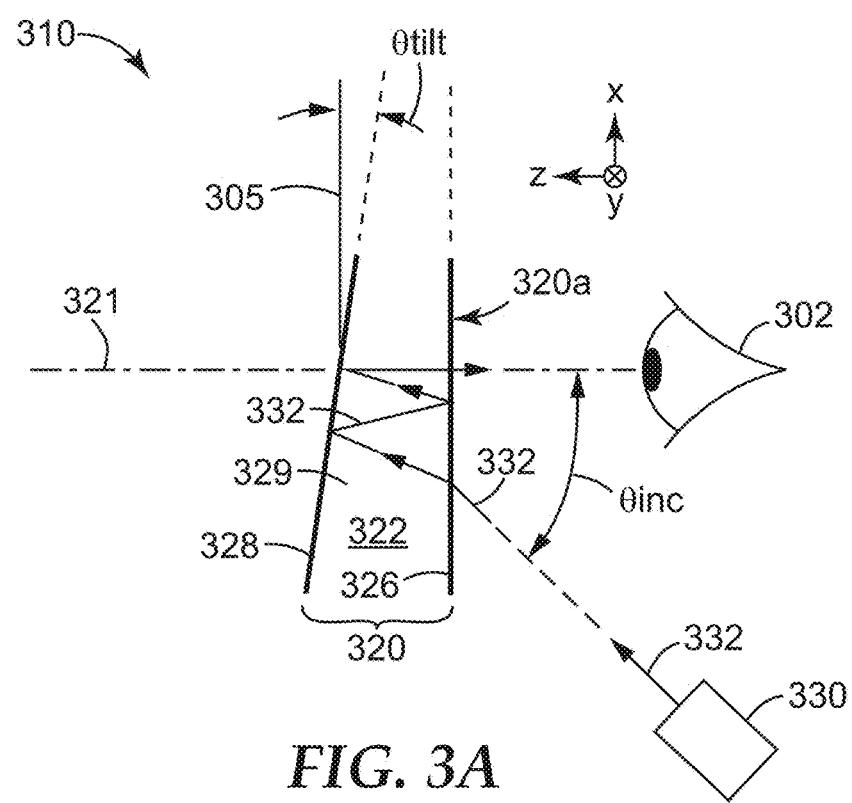
FIG. 3A is a schematic side or sectional view of a display system in which the combiner optic uses two partial reflectors configured as a wedged reflective cavity.
Figure 2B:
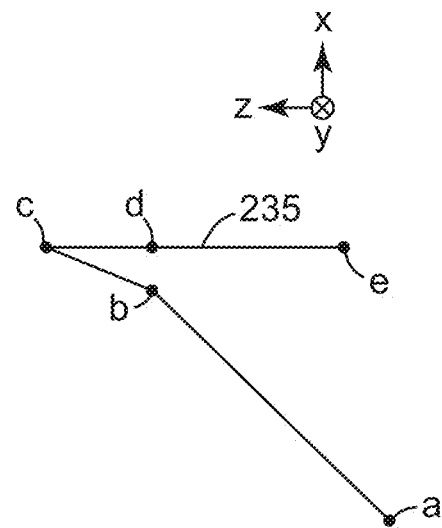
FIG. 2B shows that the light path from the imaging device to the eye for this system has only one reflection at the combiner.
Figure 3B:
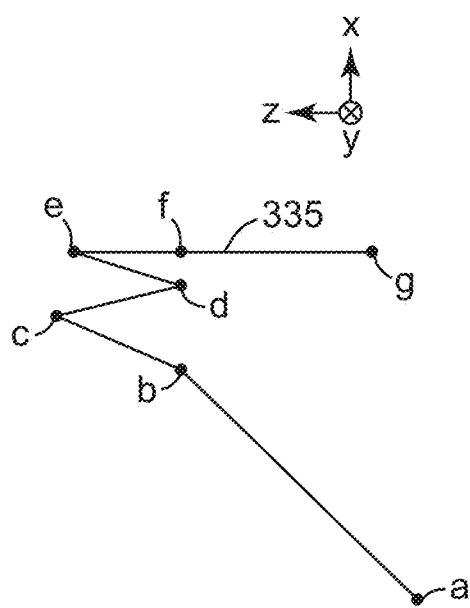
FIG. 3B shows that the light path from the imaging device to the eye for this system has three reflections in the reflective cavity.

FIGS. 2A-B and 3A-B schematically illustrate an advantage provided by optical display systems that utilize a wedged reflective cavity and multiple reflections in the optical path of the projected image, compared to systems that use only one partial reflector, and only one reflection. FIGS. 2A-B are provided for comparison or reference, and relate to a display system in which the combiner optic has only one partial reflector and uses only one reflection. FIGS. 3A-B relate to a display system in which the combiner optic has two partial reflectors arranged to form a wedged reflective cavity. Briefly, the multiple reflections provided by the wedged reflective cavity (FIG. 3A) allow the partial reflector to be oriented at a smaller tilt angle, i.e., more nearly perpendicular to the longitudinal or optical axis of the combiner optic, than the partial reflector in the comparison system (FIG. 2A). The smaller tilt angle of the partial reflector in turn allows the combiner optic of FIG. 3A to have a smaller longitudinal dimension, i.e., it can be made thinner, compared to the combiner optic of FIG. 2A.

In FIG. 2A, a display system 210 includes a combiner optic 220 which, in combination with an imaging device 230, provide a projected image to a user's eye 202. Similarly, in FIG. 3A, a display system 310 includes a combiner optic 320 which, in combination with an imaging device 330, provide a projected image to a user's eye 302. The combiner optics in these figures may have respective longitudinal or optical axes (axis 221 in FIG. 2A, axis 321 in FIG. 3A) which in both cases coincide with the optical axis of the user's eye, parallel to the z-axis. The imaging device in each case is offset from the user's eye, and oriented in a direction characterized by an incidence angle θinc relative to the longitudinal axis of the respective combiner optic. For ease of comparison, the orientation angle θinc is the same in FIGS. 2A and 3A.

In FIG. 2A, imaging light 232 is emitted from the imaging device 230 at the angle θinc toward the combiner optic 220. The imaging light 232 encounters an outer optical surface 220a of the optic 220. The outer surface 220a is assumed to be a simple air/dielectric interface, and is assumed to be perpendicular to the longitudinal axis 221. As such, a small portion of the light 232 is reflected as stray light, and the remainder is transmitted and refracted into an optical body 222 such as a prism (or lens). The optical body 222 is part of the combiner optic 220 of FIG. 2A. The transmitted, refracted light 232 propagates through the optical body 222 and is reflected at a distal optical surface of the body 222, at which a partial reflector 228 is provided. The partial reflector 228 and optical surface are tilted at an angle θtilt relative to a reference axis or plane 205 that is perpendicular to the longitudinal axis 221 of the combiner optic. The tilt angle θtilt is selected so that the portion of the light 232 that is reflected at the partial reflector 228 is directed parallel to the longitudinal axis 221 to the user's eye 202. FIG. 2B illustrates schematically the light path 235 that is followed by the imaging light 232 in the system of FIG. 2A. The imaging light 232 exits the imaging device 230 at point a, is refracted at the surface 220a at point b, is reflected at the partial reflector 228 at point c, emerges from the surface 220a of the combiner optic at point d, and reaches the user's eye at point e. Any reflections or refractions that may occur within the imaging device 230 are ignored, and are not included in our analysis of the light path 235.

In FIG. 3A, imaging light 332 is emitted from the imaging device 330 at the angle θinc toward the combiner optic 320. The angle θinc is drawn to be the same as the angle θinc in FIG. 2A. Referring still to FIG. 3A, the imaging light 332 encounters an outer optical surface 320a of the optic 320. The outer surface 320a is assumed to coincide with a partial reflector 326, and is assumed to be perpendicular to the longitudinal axis 321. As such, some of the light 332 is reflected as stray light, and the remainder is transmitted and refracted into an optical body 322 such as a prism (or lens). The optical body 322 is part of the combiner optic 320 of FIG. 3A, and it is assumed to have the same refractive index as the optical body 222 of FIG. 2A, thus producing the same angle of refraction for the light that is refracted into the outer optical surface of the combiner optic. The transmitted and refracted light 332 propagates through the optical body 322 and is reflected at a distal optical surface of the body 322, at which another partial reflector 328 is provided. The partial reflector 328 and optical surface are tilted at an angle θtilt relative to a reference axis or plane 305 that is perpendicular to the longitudinal axis 321 of the combiner optic. The partial reflectors 328, 326 thus form a wedged reflective cavity 329. The light 332 reflected at the partial reflector 328 travels to the other partial reflector 326, where a portion of it is reflected back to the partial reflector 328, and a portion of that light travels back to the partial reflector 326, where some of that light is transmitted and exits the combiner optic 320. The tilt angle θtilt of the partial reflector 328 is selected so that the portion of the light 332 that exits the combiner optic after three reflections in the cavity 329 is directed parallel to the longitudinal axis 221 to the user's eye 202. As can be seen by comparison of the figures, the tilt angle θtilt of FIG. 3A is substantially smaller than that of FIG. 2A. This is because of the three reflections that are experienced in the wedged reflective cavity of combiner optic 320.

In this regard, FIG. 3B illustrates schematically the light path 335 that is followed by the imaging light 332 in the system of FIG. 3A. The imaging light 332 exits the imaging device 330 at point a, is refracted at the partial reflector 326 (and optical surface 320a) at point b, is reflected at the partial reflector 328 at point c, is reflected at the partial reflector 326 at point d, is reflected again at the partial reflector 328 at point e, emerges from the partial reflector 326 (and optical surface 320a) at point f, and reaches the user's eye at point g. Any reflections or refractions that may occur within the imaging device 330 are ignored, and are not included in our analysis of the light path 335.

Figure 4:
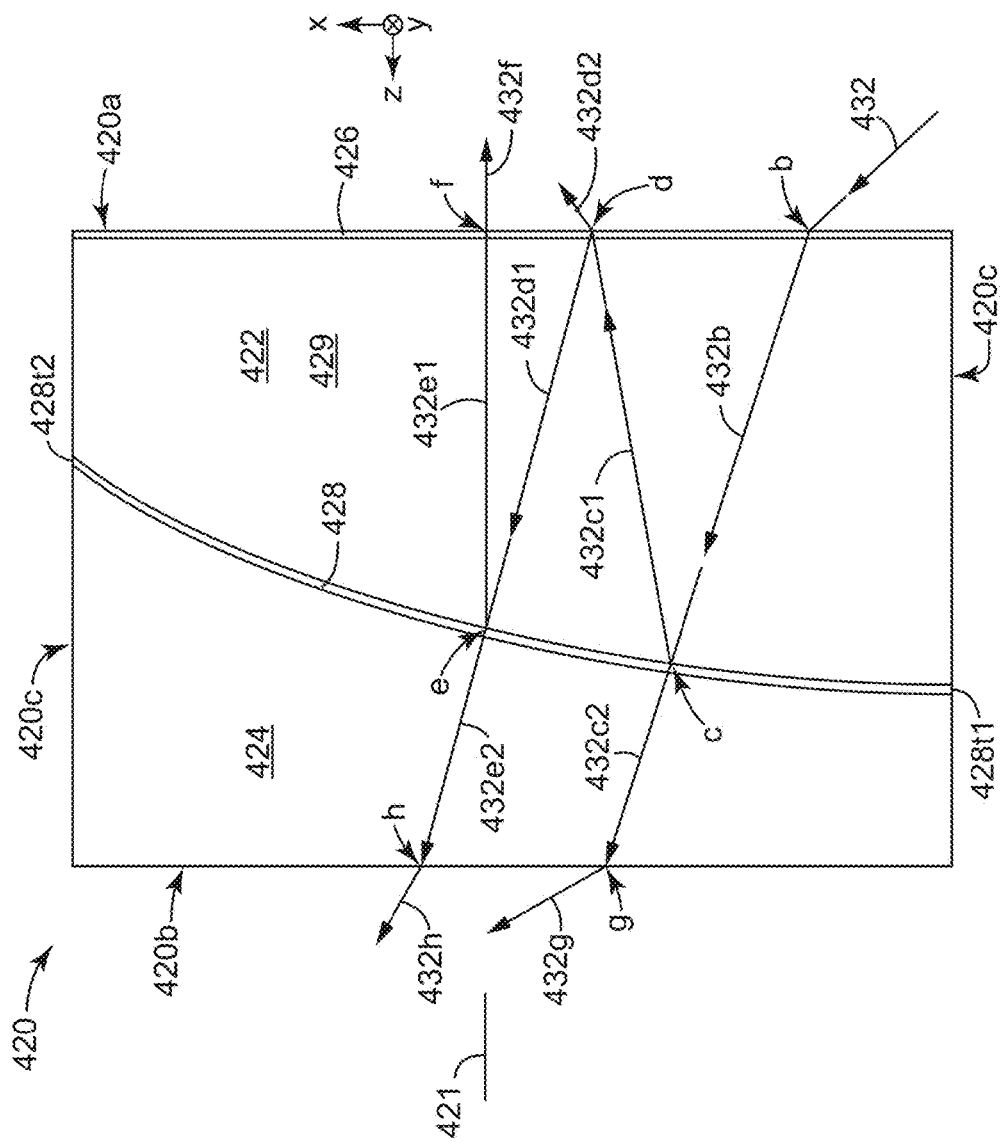
FIG. 4 is an enlarged schematic view of a combiner optic having two partial reflectors configured as a wedged cavity, with light rays drawn to show a portion of the light path from the imaging device to the eye as well as reflections and refractions of the imaging light that produce stray light beams.
Figure 5:
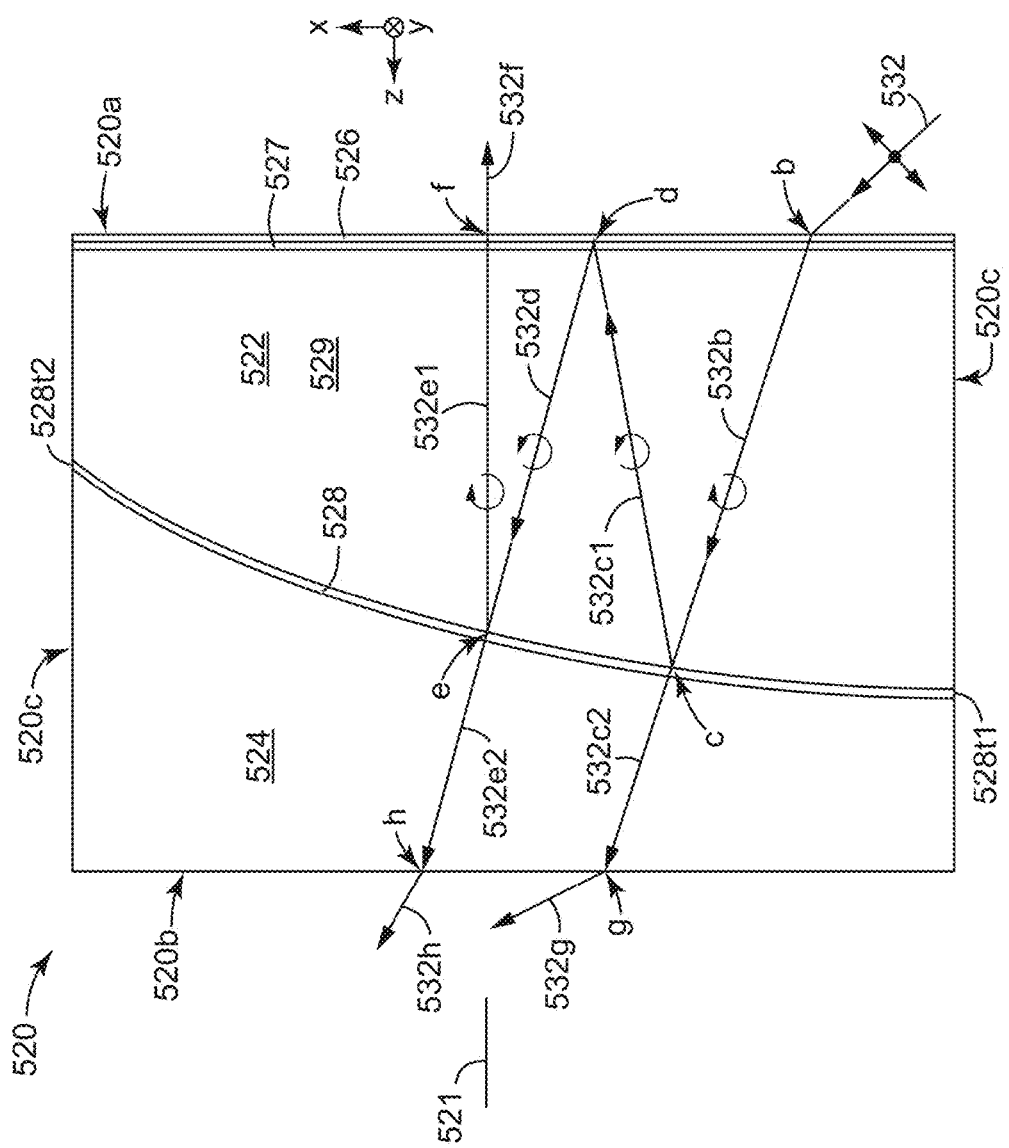
FIGS. 5 and 6 are enlarged schematic views of additional combiner optics that have two partial reflectors configured as a wedged cavity, these combiner optics also including additional elements to reduce stray light beams.
Figure 6:
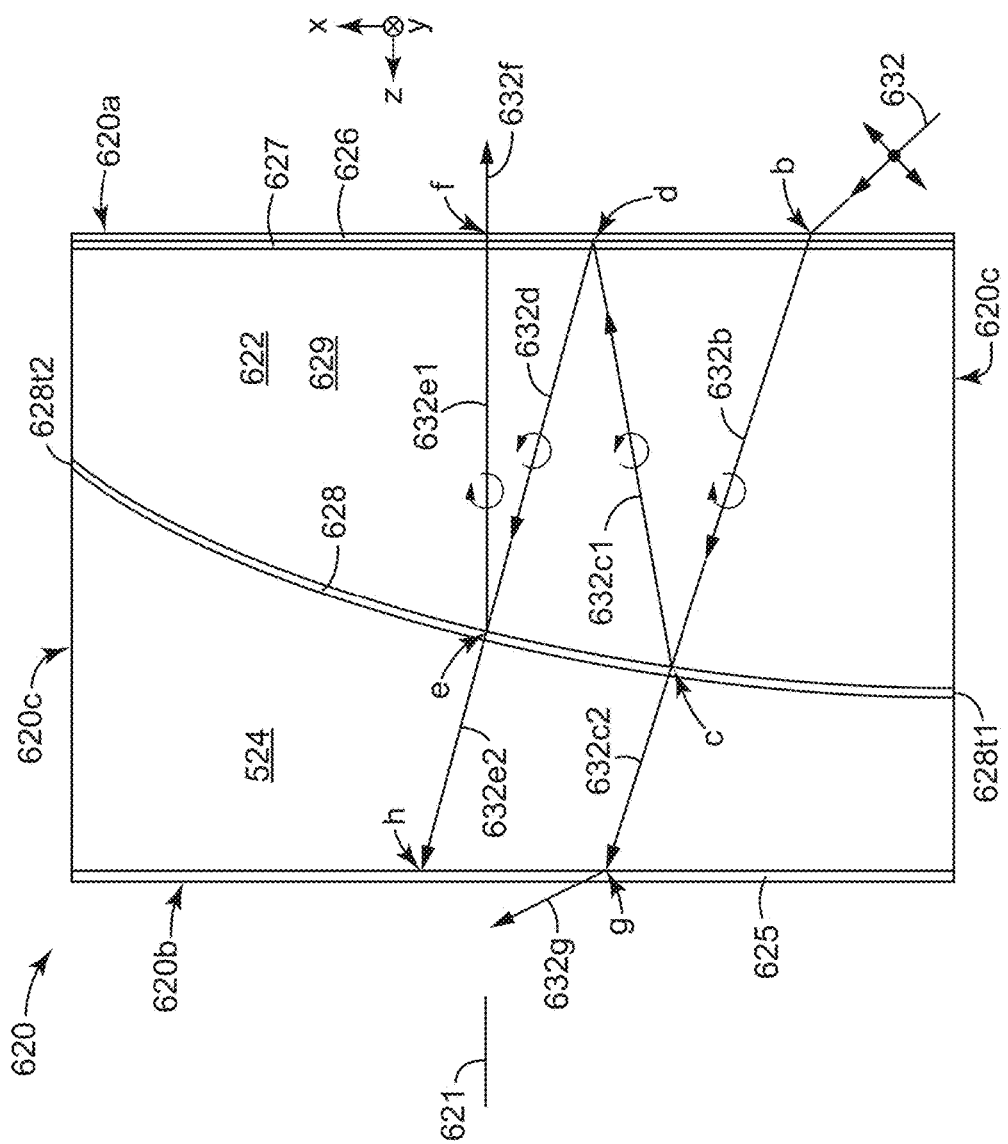

FIGS. 4, 5, and 6 illustrate in more detail various combiner optic embodiments, each of which includes two partial reflectors arranged to form a wedged reflective cavity. In some of these embodiments, the partial reflectors and other elements of the system are tailored to reduce or eliminate one or more stray light beams.

In FIG. 4, a combiner optic 420 is of the type that can be used in the disclosed display systems. The optic 420 has opposed first and second optical surfaces 420a, 420b. The optical surface 420a is at a proximal end of the optic 420, suitable for placement near a user's eye. The optical surface 420b is at a distal end of the optic 420. A circumferential side surface 420c connects the first and second optical surfaces 420a, 420b. The combiner optic 420 includes distinct optical bodies (lenses) 422, 424, whose curved optical surfaces substantially mate with each other and which are bonded or otherwise attached or affixed together, but with a partial reflector disposed therebetween. The combiner optic 420 defines a longitudinal or optical axis 421. This axis 421 may coincide with the optical axis of the user's eye when the display system, of which the combiner optic 420 is a part, is properly positioned. The axis 421 may also be perpendicular to the optical surfaces 420a, 420b, which may be planar and parallel to each other. The combiner optic 420 includes a partial reflector 426 and a partial reflector 428. The partial reflector 428 is embedded in the combiner optic 420, sandwiched between the optical bodies 422, 424, and tilted and curved in such a way that it is not symmetric with respect to the longitudinal axis 421. The partial reflector 428 may also have a terminus that extends completely around the circumferential side surface 420c, see terminus 428t1, 428t2. The partial reflector 426 may be attached to, applied to, or formed on the optical surface of the body 422 at the proximal end of the optic 420. The partial reflector 426, and the optical surface it is attached to, may be planar and orthogonal to the longitudinal axis 421 as shown, or they may be tilted (not orthogonal) relative to the longitudinal axis, and/or they may be non-planar, e.g., having a concave or convex curvature. In any case, one or both of the partial reflectors 426, 428 are tilted relative to the longitudinal axis so that the reflective cavity 429 has a wedged configuration. The partial reflectors 426, 428 and the cavity 429 are designed so that imaging light of the projected view follows a path from the imaging device to the user's eye that includes three reflections in the cavity 429.

In general, a variety of different films, layers, and similar elements can be used for the partial reflectors that form the reflective cavity in the disclosed display systems. For practical reasons of size, space, and/or weight, each partial reflector preferably has a thin form factor, such as in the case of a single layer film or multiple layer film or film combination, the overall thickness of which may be e.g. less than 1 mm, or less than 0.5 mm, or less than 0.1 mm, rather than a bulk optical component. A given partial reflector provides more reflectivity than that of a simple dielectric/air interface, but not so much that the partial reflector's transmission is so low that (in combination with the other partial reflector and other components of the combiner optic) the user can no longer see remote objects through the combiner optic. For example, one or both partial reflectors may have an average reflectivity for visible light, and/or for the imaging light that is emitted by the imaging device of the display system, in a range from 25% to 75%. Similarly, one or both partial reflectors may have an average transmission for visible light, and/or for the imaging light that is emitted by the imaging device of the display system, in a range from 25% to 75%. In many cases, the partial reflector has a small or negligible absorption over the wavelength range of interest, such that the sum of the reflectivity and the transmission of the partial reflector equals 100% at any given wavelength, polarization, and incidence angle. In other cases, absorption of a partial reflector may be more significant, such that the sum of reflectivity and transmission is substantially less than 100% over some or all of the wavelength range of interest.

In some cases, the transmission and reflectivity of a given partial reflector may exhibit little or no variation as a function of the optical wavelength, and also little or no variation as a function of polarization (for normal and near-normal angles of incidence). For example, a simple, thin vapor coat of aluminum, silver, or other suitable metal or material can be applied to a clear film, or directly to an optical surface of a lens, prism, or other optical body in the combiner optic, and such a vapor coat may have a reflectivity and transmission that is constant, or substantially constant, over some or all of the visible wavelength range, and independent, or substantially independent, of polarization state (for light that is incident at normal or near-normal angles). As another example, some multilayer optical films, such as some of those discussed in patent application publication US 2010/0165660 (Weber et al.), can be designed to provide a broad reflection band of intermediate reflectivity (i.e., partially reflective, with a complimentary, intermediate transmission), with the reflectivity and transmission being substantially constant as a function of wavelength and as a function of polarization over moderate wavelength ranges and incidence angles. The multilayer optical film may be a polymeric film made of a large number, e.g., tens, hundreds, or thousands, of coextruded polymer layers, or it may be made of alternating layers of high and low refractive index inorganic materials (e.g., silicon dioxide, titanium dioxide, and other known inorganic optical materials) that are sequentially evaporated onto a carrier film or other substrate in a vapor coating chamber.

In other cases, the transmission and reflectivity of a given partial reflector may exhibit significant variation as a function of wavelength, but little or no variation as a function of polarization (for normal and near-normal angles of incidence). For example, by appropriate control of the layer thickness profile of the layers in a polymeric or inorganic multilayer optical film, one or more distinct reflection bands can be produced, such that the reflector provides moderate to high reflectivity in such reflection band(s) and much lower reflectivity at other wavelengths, with a complementary transmission spectrum (i.e., moderate to low transmission at the reflection band(s), and much higher transmission at other wavelengths). Such optical films are referred to herein as (spectrally) notched reflectors, because their reflection or transmission spectra have a notched or peaked appearance due to the presence of the distinct, isolated reflection band(s). A given isolated reflection band can be made quite narrow, e.g., the spectral width of the reflection band, as measured by the full-width at half-maximum (FWHM), may be less than 100 nanometers, or less than 75 nanometers. This may be contrasted with partial reflectors that exhibit little or no spectral variability, which may have no distinct reflection band whose FWHM is less than 100 nanometers.

In other cases, the transmission and reflectivity of a given partial reflector may exhibit little or no variation as a function of wavelength, but significant variation as a function of polarization (for normal and near-normal angles of incidence). Examples of this include broadband reflective polarizers, e.g., reflective polarizers designed to operate over most or all of the visible wavelength spectrum. Reflective polarizers have a high, or relatively high, reflectivity for a block state of polarization, and a low reflectivity (and high transmission) for a pass state of polarization. In some cases, such as for certain multilayer optical films that are oriented by stretching, the block and pass states are linear polarization states that are physically orthogonal to each other. In other cases, such as with certain cholesteric optical films, the block and pass states are circular or elliptical polarization states that are mathematically, but not physically, orthogonal to each other. Regardless of whether the reflective polarizing film is stretched, cholesteric, or otherwise, the layer thickness profile of such films can be tailored so that the reflectivity of the block state can be broad and relatively constant, or at least slowly varying, as a function of wavelength in the wavelength range of interest. A reflective polarizer for circular polarization states can also be constructed by combining a linear polarizer with a retarder layer, e.g., a nominally quarter-wave ($\lambda/4$) retarder layer, that is suitably oriented.

In still other cases, the transmission and reflectivity of a given partial reflector may exhibit significant variation as a function of both wavelength and polarization. Examples of this include oriented multilayer polymer films whose birefringent layers provide the polarization variability and whose layer thickness profile is tailored to provide a desired wavelength variability, e.g., one or more isolated reflection bands. Such a film may for example provide a notched reflection spectrum for a block state of polarization, and little or no reflection (hence, high transmission) for a pass state of polarization. When used as a partial reflector in the disclosed combiner optics with an imaging device whose emitted imaging light is substantially matched in wavelength and polarization to the partial reflector (e.g., the partial reflector may have a notched reflectivity for the block polarization, and the imaging device may emit light only in spectral band(s) or peak(s) corresponding to the reflection band(s) of the notched reflector, the light of the imaging device also being polarized in the block state), the film can have a surprisingly high average transmission for unpolarized ambient white light, but also a high reflectivity for the imaging light emitted by the imaging device.

Combinations of various types of partial reflectors, including those discussed above, can be used in the disclosed display systems. The two partial reflectors that form the wedged reflective cavity may be of the same type, e.g., they may both exhibit little or no variability in wavelength or polarization, or they may both be notched reflectors and/or reflective polarizers. Alternatively, the two partial reflectors may be of different types. In some cases, the partial reflectors may be selected to increase or maximize system efficiency, e.g., provide high transmission for ambient light of the world view while also providing high reflectivity for imaging light of the projected view. The partial reflectors may also be selected to reduce or eliminate stray light beams that may be emitted from the proximal and/or distal ends of the combiner optic.

Turning our attention back to FIG. 4, we can review its operation in connection with the imaging light provided by the imaging device. Although the imaging device is not shown in FIG. 4, it may be positioned and oriented with respect to the combiner optic as appropriate, e.g. as indicated in FIGS. 1 and 3A. A representative ray 432 of the imaging light originates from the imaging device, interacts with the combiner optic 420 by reflection, refraction, and transmission, and then enters the eye of the user along the longitudinal axis 421. The ray 432 is part of a large bundle of rays that make up the imaging light. Exiting the imaging device at a point "a" (not shown in FIG. 4 but see e.g. FIG. 3B), the ray 432 follows a path in which it encounters the optical surface 420a, and the partial reflector 426, at point b. The partial reflector 426 may be of a simple design, e.g. a single vapor-coated layer of aluminum, or it may be any other suitable partial reflector as discussed above. Some of the light 432 is reflected here, and a remaining portion is transmitted by the partial reflector 426 and enters the wedged reflective cavity 429, and the optical body 422, by refraction. The transmitted/refracted portion of the light 432, now labeled 432b, then propagates within the reflective cavity 429 and optical body 422, where a portion of it is reflected first by the partial reflector 428 at point c (producing ray 432c1), then by the partial reflector 426 at point d (producing ray 432d1), and again by the partial reflector 428 at point e (producing ray 432e1). The encounters at points c, d, and e also in general may produce transmitted rays 432c2, 432d2, 432e2 as shown: the ray 432d2 results from transmission through the partial reflector 426 and refraction out of the combiner optic 420; rays 432c2 and 432e2 propagate through the optical body 424 to the optical surface 420b at points g and h, respectively, and are refracted there out of the combiner optic 420 into the surrounding air to provide rays 432g, 432h, respectively. The rays 432d2, 432g, and 432h may be considered extraneous or stray beams of imaging light. In some applications, such stray light may be entirely acceptable, and may not have any significant detrimental impact on the operation of the display system. In other applications, one or more of the stray light beams may be undesirable or unacceptable.

Turning again to the light ray whose path begins at the imaging device and ends at the eye of the user, and which forms or helps to form the projected image, the ray 432e1 is the result of a second reflection at the partial reflector 428 and a third reflection in the wedged reflective cavity 429. The ray 432e1 propagates along the longitudinal axis 421, and part of it is transmitted by the partial reflector 426 at point f to produce ray 432f. The ray 432f then propagates further along the longitudinal axis 421 until it enters the eye of the user (not shown in FIG. 4) to produce the projected image.

At least some of the stray light can be reduced or eliminated through judicious selection of partial reflectors, imaging light, and in some cases one or more other elements of the display system. FIGS. 5 and 6 schematically illustrate two such embodiments.

In FIG. 5, a combiner optic 520 suitable for use in the disclosed near-eye display systems is shown. Many of the constituent parts of the optic 520 may be the same as or similar to corresponding parts of the optic 420 of FIG. 4. Thus, for example, combiner optic 520 has opposed first and second optical surfaces 520a, 520b. The optical surface 520a is at a proximal end of the optic 520, suitable for placement near a user's eye. The optical surface 520b is at a distal end of the optic 520. A circumferential side surface 520c connects the first and second optical surfaces 520a, 520b. The combiner optic 520 includes distinct optical bodies (lenses) 522, 524, which may be the same as the corresponding bodies of FIG. 4. The combiner optic 520 defines a longitudinal or optical axis 521, which may be the same as that of FIG. 4. The combiner optic 520 includes a partial reflector 526 and a partial reflector 528. The partial reflector 528 is embedded in the combiner optic 520, sandwiched between the optical bodies 522, 524, and tilted and curved in such a way that it is not symmetric with respect to the longitudinal axis 521, and such that it forms a wedged reflective cavity 529 with the other partial reflector 526. The partial reflector 528 may also have a terminus that extends completely around the circumferential side surface 520c, see terminus 528t1, 528t2. At the proximal end of the optic 520, a partial reflector 526 in combination with a retarder layer 527 are attached to, applied to, or formed on the optical surface of the body 522 as shown. In this case, the partial reflector 526 is a linear reflective polarizer (whether spectrally broadband or spectrally narrow band (e.g. notched)), and the retarder layer 527 is substantially a quarter-wave retarder ($\lambda/4$) whose in-plane fast axis is oriented relative to a pertinent in-plane axis of the reflective polarizer (such as its pass axis or block axis) so that linearly polarized imaging light transmitted by the partial reflector 526 is converted by the retarder layer 527 to circularly polarized imaging light. Stated differently, the retarder layer 527 in combination with the liner reflective polarizer (partial reflector) 526 reflect circularly polarized light of one handedness (e.g. a "clockwise" or CW circular polarization state) and transmits circularly polarized light of the other handedness (e.g. a "counter-clockwise" or CCW circular polarization state). The partial reflectors 526, 528 and the cavity 529 are designed so that imaging light of the projected view follows a path from the imaging device to the user's eye that includes three reflections in the cavity 529. The retarder layer 527 and reflective polarizer (partial reflector) 526 are provided to reduce or eliminate a stray beam of imaging light analogous to ray 432d2 of FIG. 4.

We review now the operation of the combiner optic 520 in connection with the imaging light provided by the imaging device. A representative ray 532 of the imaging light originates from the imaging device, interacts with the combiner optic 520, and then enters the user's eye along the longitudinal axis 521. The ray 532 is part of a large bundle of rays that make up the imaging light, and this light (including ray 532) may be polarized or unpolarized, but preferably it is polarized to match the pass axis of the reflective polarizer (partial reflector 526). After exiting the imaging device, the ray 532 follows a path in which it encounters the optical surface 520a, and the partial reflector 526 and retarder layer 527, at point b. The partial reflector 526 is a linear reflective polarizer, as stated above. At point b, a linearly polarized component of the ray 532 corresponding to the pass state of the reflective polarizer is transmitted by the reflective polarizer 526 (thus entering the reflective cavity 529), and the remainder (if any) is reflected. (Note, if the ray 532 is linearly polarized along the pass axis of the reflective polarizer 526, then there will be little or no component of ray 532 in the block state of the reflective polarizer, and thus there may be little or no reflected ray at point b.) Also generally at point b, as the linearly polarized imaging light transmitted by the reflective polarizer 526 enters the reflective cavity 529, it passes through the retarder layer 527, which converts the transmitted/refracted ray 532b to a circularly polarized state, e.g., CW as shown. The ray 532b then propagates across the reflective cavity 529, where a portion of it is reflected first by the partial reflector 528 at point c (producing ray 532c1), then by the partial reflector 526 at point d (producing ray 532d1), and again by the partial reflector 528 at point e (producing ray 532e1). The encounters at points c and e also in general may produce transmitted rays 532c2, 532e2 as shown, which propagate through the optical body 524 to the optical surface 520b at points g and h, respectively, and are refracted there out of the combiner optic 520 into the surrounding air to provide stray rays 532g, 532h, respectively.

Transmitted light is substantially avoided at point d, thus avoiding a stray ray analogous to ray 432d2 of FIG. 4. This is due to the combined actions of the reflective polarizer, the retarder layer, and the other partial reflector. Thus, when the CW circularly polarized ray 532b is reflected at the partial reflector 528, a $\pi$ phase shift typically occurs, which converts the CW polarization state to an "orthogonal" CCW polarization state for the reflected ray 532c1. This polarization state is substantially entirely reflected by the retarder layer 527/reflective polarizer 526 combination at point d, with little or no transmitted light. The CCW polarization state is maintained for the reflected ray 532d, but reversed again to CW at point e for the reflected ray 532e1. With the CW polarization state, the ray 532e1, which propagates along the longitudinal axis 521, is highly transmitted at point f by the retarder layer 527/reflective polarizer 526 combination, thus producing ray 532f. The ray 532f then propagates further along the longitudinal axis 521 until it enters the eye of the user to produce the projected image.

In alternative embodiments to FIG. 5, the quarter-wave retarder layer 527 may be located elsewhere within the combiner optic 520, as long as it is between the partial reflectors 526, 528, and still achieve the objective of reducing or eliminating stray imaging light at point d.

The embodiment of FIG. 6 may be the same as or similar to that of FIG. 5, except that another element or elements are added to the distal end of the combiner optic to reduce or eliminate one of the stray rays of imaging light emerging from that end of the combiner optic.

Many of the constituent parts of the combiner optic 620 may be the same as or similar to corresponding parts of the optic 520 of FIG. 5. Thus, for example, combiner optic 620 has opposed first and second optical surfaces 620a, 620b. The optical surface 620a is at a proximal end of the optic 620, suitable for placement near a user's eye. The optical surface 620b is at a distal end of the optic 620. A circumferential side surface 620c connects the first and second optical surfaces 620a, 620b. The combiner optic 620 includes distinct optical bodies (lenses) 622, 624, which may be the same as the corresponding bodies of FIG. 5. The combiner optic 620 defines a longitudinal or optical axis 621, which may be the same as that of FIG. 5. The combiner optic 620 includes a partial reflector 626 and a partial reflector 628. The partial reflector 628 is embedded in the combiner optic 620, sandwiched between the optical bodies 622, 624, and tilted and curved in such a way that it is not symmetric with respect to the longitudinal axis 621, and such that it forms a wedged reflective cavity 629 with the other partial reflector 626. The partial reflector 628 may also have a terminus that extends completely around the circumferential side surface 620c, see terminus 628t1, 628t2. At the proximal end of the optic 620, a partial reflector 626 in combination with a retarder layer 627 are attached to, applied to, or formed on the optical surface of the body 622 as shown. The partial reflector 626 and retarder layer 627 may be substantially the same as the corresponding elements in FIG. 5; hence, the partial reflector 626 is a linear (broadband or narrow band) reflective polarizer, and the retarder layer 627 is a quarter-wave ($\lambda/4$) retarder. The partial reflectors 626, 628 and the cavity 629 are designed so that imaging light of the projected view follows a path from the imaging device to the user's eye that includes three reflections in the cavity 629. The retarder layer 627 and reflective polarizer (partial reflector) 626 are provided to reduce or eliminate a stray beam of imaging light analogous to ray 432d2 of FIG. 4, in similar fashion to the description of FIG. 5.

The rays of imaging light 632, 632b, 632c1, 632d, 632e1, and 632f, as well as imaging light rays 632c2, 632e2, and 632g, and the points b, c, d, e, f, g, and h, may all correspond substantially to their respective counterparts in FIG. 5, with no further explanation needed. The combiner optic 620 of FIG. 6 differs, however, from optic 520 by the addition of a film or films at the distal end of the optic which absorb one of the circular polarization states of the imaging light ray. Such film or films is represented in FIG. 6 by absorbing layer 625. The absorbing layer 625 may be or include, for example, a linear absorbing polarizing film laminated to another quarter-wave ($\lambda$/4) retarder film. When properly oriented relative to each other, this film combination causes the absorbing layer 625 to absorb imaging light of one circular polarization state (e.g. CCW) and to transmit imaging light of the orthogonal circular polarization state (e.g. CW). The transmitted rays 632c2, 632e2 are of opposite circular polarization states, the former being CW like ray 632b, and the latter being CCW like ray 632d. As such, the absorbing layer 625 can be used to reduce or eliminate one of the stray beams, such as the one that would otherwise emerge at point h from ray 632e2.

Numerous modifications can be made within the scope of the present disclosure, and features and aspects described in connection with one embodiment will be understood to be applicable also to related embodiments. For example, similar to the discussion from FIG. 5, the quarter-wave retarder layer 627 may, in alternative embodiments to FIG. 6, be located elsewhere within the combiner optic 620, as long as it is between the partial reflectors 626, 628, and still achieve the objective of reducing or eliminating stray imaging light at point d. If a reflective polarizer is used as a partial reflector in any of the disclosed embodiments, e.g. as described in connection with FIG. 5 or 6, the reflective polarizer may have a reflectivity for white light in the block state of polarization of over 99%, of over 90%, of over 70%, or over about 50%. Also, in any cases where a reflective polarizer is used as a partial reflector, it may be or comprise any suitable reflective polarizer, including e.g. a linear reflective polarizer such as a birefringent reflective polarizer, a wire grid reflective polarizer, a fiber reflective polarizer, or a disperse reflective polarizer, or a circularly reflective polarizer, such as a cholesteric reflective polarizer. Furthermore, the disclosed combiner optics can be used in a wide variety of alternative optical imaging systems. In some cases, for example, the imaging light may include both visible light and invisible (e.g., infrared or ultraviolet) light, while in other cases, the imaging light may include infrared and/or ultraviolet light but little or no visible light. The detector of the imaging light may be or include a human eye as described above, or it may instead be or include an electronic detector such as a CCD array or other suitable solid state device or array of devices, disposed to receive the imaging light that is reflected by and exits the wedged reflective cavity.

In still other alternative embodiments, each of the disclosed combiner optics can be readily modified such that it no longer functions as a combiner optic, while still retaining the wedged reflective cavity to reflect light that is incident on one side of the optic. This may be done by replacing one of the partial reflectors with a full reflector, i.e., a reflector whose transmission at the wavelength(s) of interest is negligible or zero. For example, the partial reflector 528 in FIG. 5 may be replaced with an identically shaped full reflector (e.g. a much thicker vapor coat of metal) that has a higher reflectivity and is substantially opaque at the wavelength(s) of interest. Alternatively or in addition, the modification may be done by incorporating an opaque or substantially opaque body, layer, or other element(s) on one side of the wedged reflective cavity. For example, the optical body 524 in FIG. 5 may be made of an opaque material, and/or an opaque coating may be applied to the second optical surface 520b. In any of these cases, the optic, as modified, no longer transmits sufficient light at the wavelength(s) of interest to permit detection of remote objects through the optic, hence, it is no longer considered to be a combiner optic. Such a modified optic, however, still possesses a wedged reflective cavity that is configured to redirect light from a source (such as source 330 in FIG. 3A) to a detector (such as the eye 302 in FIG. 3A, or a similarly positioned electronic detector) along an optical path that includes three reflections in the wedged reflective cavity, as described above. The wedged reflective cavity may of course also include a retarder layer, such as a $\lambda$/4 retarder between the two reflectors as described above.

Example

The foregoing principles were used to fabricate a combiner optic suitable for use in near-eye display systems as discussed herein.

In the example, a commercially available plano-convex lens was obtained as a first optical body. The lens was obtained from Thorlabs, Inc., Newton, N.J., USA, having product code LA1417. The convex curved optical surface of the lens had a 77 mm radius of curvature. A commercially available plano-concave lens was obtained as a second optical body. This second lens was also obtained from Thorlabs, Inc., Newton, N.J., but having product code LC1611. The concave curved optical surface of this lens also had a radius of curvature of about 77 mm, and thus had a mating shape relative to the convex shape of the first optical body.

Figure 7:
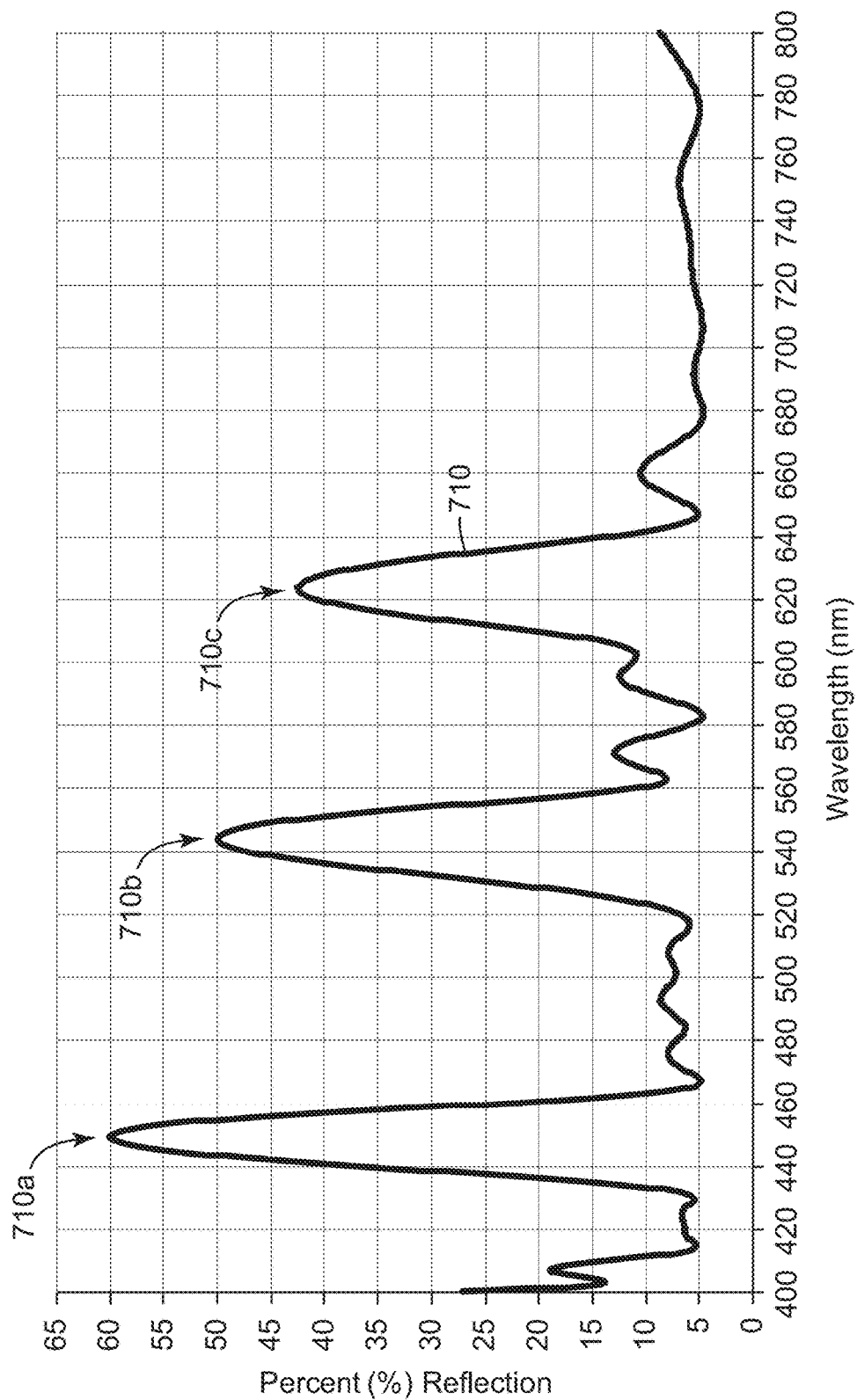
FIG. 7 is a graph of the measured spectral reflectivity of a partial reflector that was combined with another partial reflector to make a combiner optic that was made and tested.

A first partial reflector was formed on the convex optical surface of the first optical body. This partial reflector was formed by evaporating alternating layers of inorganic optical materials on the convex surface of the lens to form an inorganic multilayer stack. The multilayer stack had a total of about 36 layers, and used TiO2 and Al2O3 as the inorganic materials. The overall thickness of the multilayer stack was less than 5 microns. The thicknesses of its individual layers were such that the multilayer stack functioned as a notched reflector, with a reflectivity as shown as curve 710 in FIG. 7. The reflectivity of FIG. 7 was measured on a spectrophotometer using unpolarized light at normal incidence to the stack. The normal incidence reflectivity of the multilayer stack was substantially polarization insensitive. As seen in the curve 710, the notched reflector produced by the multilayer stack had three distinct reflection bands: a band 710a which peaked at 450 nm (blue light), a band 710b which peaked at 547 nm (green light), and a band 710c which peaked at 624 nm (red light).

The first partial reflector (the inorganic multilayer stack) was then sandwiched between the first and second optical bodies by bonding the exposed side of the multilayer stack to the concave optical surface of the second optical body using a UV curable adhesive.

A linear reflective polarizing film was then obtained for use as a second partial reflector. The reflective polarizing film used was product code APF, available from 3M Company, St. Paul, Minn., which is a polymeric multilayer optical film. Before applying this film to the planar optical surface of the plano-convex lens, a quarter-wave retarder film was applied and bonded to that surface using an optically clear adhesive, product code OCA available from 3M Company, St. Paul, Minn. The reflective polarizing film was then applied and bonded to the retarder film using the same optically clear adhesive, such that the pass axis of the reflective polarizer was at a 45 degree angle to the fast axis of the retarder film. (The block axis of the reflective polarizer was thus also at a 45 degree angle to the fast axis of the retarder film.) After this, the lens combination was cut in half axially to produce two combiner optics having mirror symmetry relative to each other.

Figure 8:
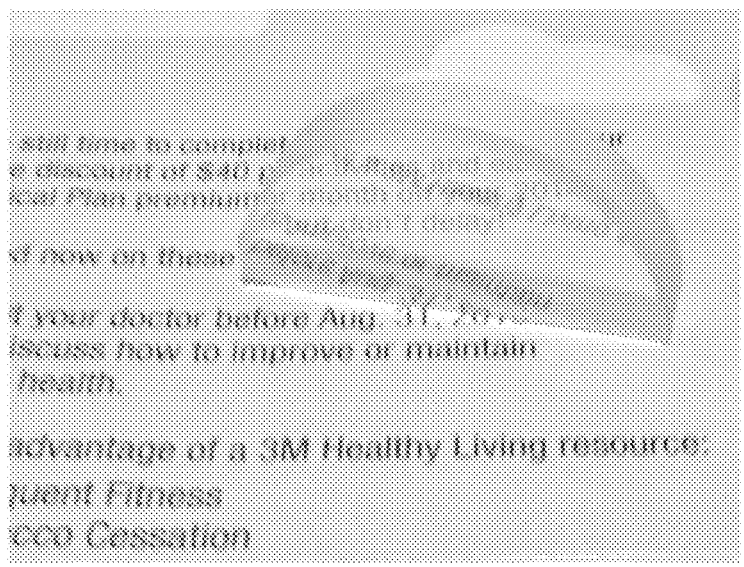
FIG. 8 is a photograph of the combiner optic that was made and tested, the combiner optic placed on a printed surface so that transmitted and reflected images can be seen.
Figure 9:
FIG. 9 is a photograph of the combiner optic being illuminated with polarized imaging light and reflecting the imaging light onto a surface.

One of the resulting combiner optics is pictured in FIGS. 8 and 9. In FIG. 8, the combiner optic is shown resting on a printed surface in a room lit by ambient office lights. In this photograph, the (planar) reflective polarizer side of the optic faces the viewer, and both transmitted and reflected images of the nearby text can be seen. FIG. 9 is a photograph that shows the combiner optic producing a reflected (real) image. The output of a monochrometer was directed through a 10 mm by 1 mm aperture, and then through an absorbing polarizer. The aperture can be seen to be imaged onto a plane near the lens in reflection.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. The reader should assume that features of one disclosed embodiment can also be applied to all other disclosed embodiments unless otherwise indicated. All U.S. patents, patent application publications, and other patent and non-patent documents referred to herein are incorporated by reference, to the extent they do not contradict the foregoing disclosure.

The invention claimed is:

1. A combiner optic comprising:
    a first lens comprising a first major surface and an opposing curved second major surface;
    a second lens comprising a curved major surface facing and substantially matching the curved second major surface of the first lens;
    a partial reflector sandwiched between the curved major surface of the second lens and the curved second major surface of the first lens; and
    a reflective polarizer disposed on the first major surface of the first lens, the partial reflector and the reflective polarizer forming a wedged reflective cavity and having sufficient light transmission to permit viewing of an object through the combiner optic.

2. The combiner optic of claim 1, wherein the reflective polarizer is a linear reflective polarizer.

3. The combiner optic of claim 1, wherein the reflective polarizer is a circular reflective polarizer.

4. The combiner optic of claim 1, wherein the partial reflector is a notched reflector, and wherein over a wavelength range from 400-700 nm, the notched reflector comprises at least one distinct reflection band whose full width at half maximum (FWHM) is less than 100 nanometers.

5. The combiner optic of claim 1, wherein the partial reflector has a reflectivity at normal incidence that is substantially insensitive to polarization state.

6. The combiner optic of claim 1, wherein for visible light, each of the partial reflector and the reflective polarizer has an average reflectivity in a range from 25% to 75%, and an average transmission in a range from 25% to 75%.

7. The combiner optic of claim 1 further comprising a retarder layer disposed between the partial reflector and the reflective polarizer.

* * * * *